United States Patent [19]
Ray

[11] 3,773,067
[45] Nov. 20, 1973

[54] APPARATUS FOR EFFECTING OPERATIONS ON A FITTING ON A HIGH PRESSURE GAS MAIN

[75] Inventor: Charles William Ray, Ft. Wayne, Ind.

[73] Assignee: Emmett O. Bandy, Indianapolis, Ind.

[22] Filed: Aug. 23, 1971

[21] Appl. No.: 174,121

Related U.S. Application Data

[62] Division of Ser. No. 807,846, March 17, 1969, Pat. No. 3,626,576.

[52] U.S. Cl. ............................................. 137/318
[51] Int. Cl. ...................... B23b 41/08, F16e 41/04
[58] Field of Search ........................... 137/317, 318; 29/157.1

[56] References Cited
UNITED STATES PATENTS

| | | | |
|---|---|---|---|
| 2,414,911 | 1/1947 | Temple | 137/318 X |
| 2,756,486 | 7/1956 | Smith | 137/318 X |
| 2,838,965 | 6/1958 | Mueller et al. | 137/318 |
| 3,533,424 | 10/1970 | Wedge | 137/318 X |
| 3,626,576 | 12/1971 | Ray | 29/157.1 R |

Primary Examiner—Martin P. Schwadron
Assistant Examiner—David R. Matthews
Attorney—William R. Coffey

[57] ABSTRACT

In repairing gas mains, a fixture is clamped to the main at the location of the repair, and a conduit is then joined to the main through a sealed fit. The conduit has a valve which separates the conduit into two compartments, and the end of the conduit is adapted to receive a tool mounting, the valve being opened and a tool passed through the conduit to perform repair operations on the main. The tool mounting is connected to the conduit through a sealed connection, and the tool can be operated through the tool mounting means by an operator so that the repair operation occurs through a sealed conduit. The entire operation occurs with normal operation of the main under its usual operating condition of internal superatmospheric pressure.

This superatmospheric pressure can be varied and the present invention contemplates pressure for gas mains in the range of 60 psi – 120 psi, other pressures for other materials such as petroleum, water, etc., varying as desired.

11 Claims, 7 Drawing Figures

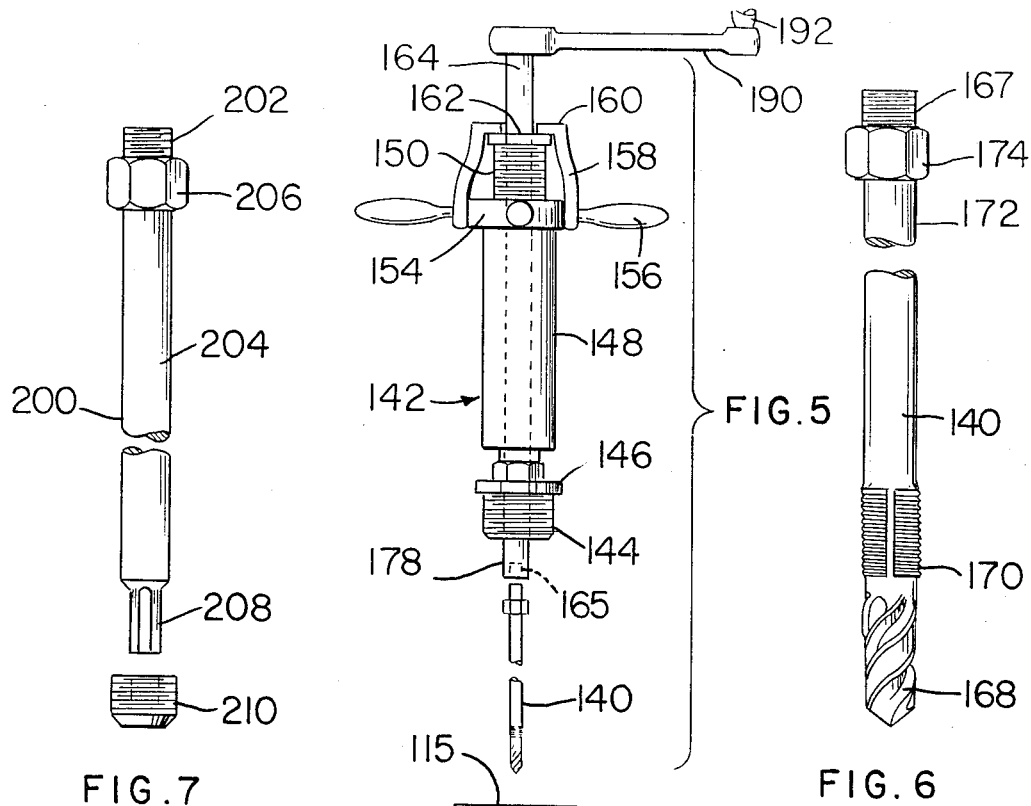
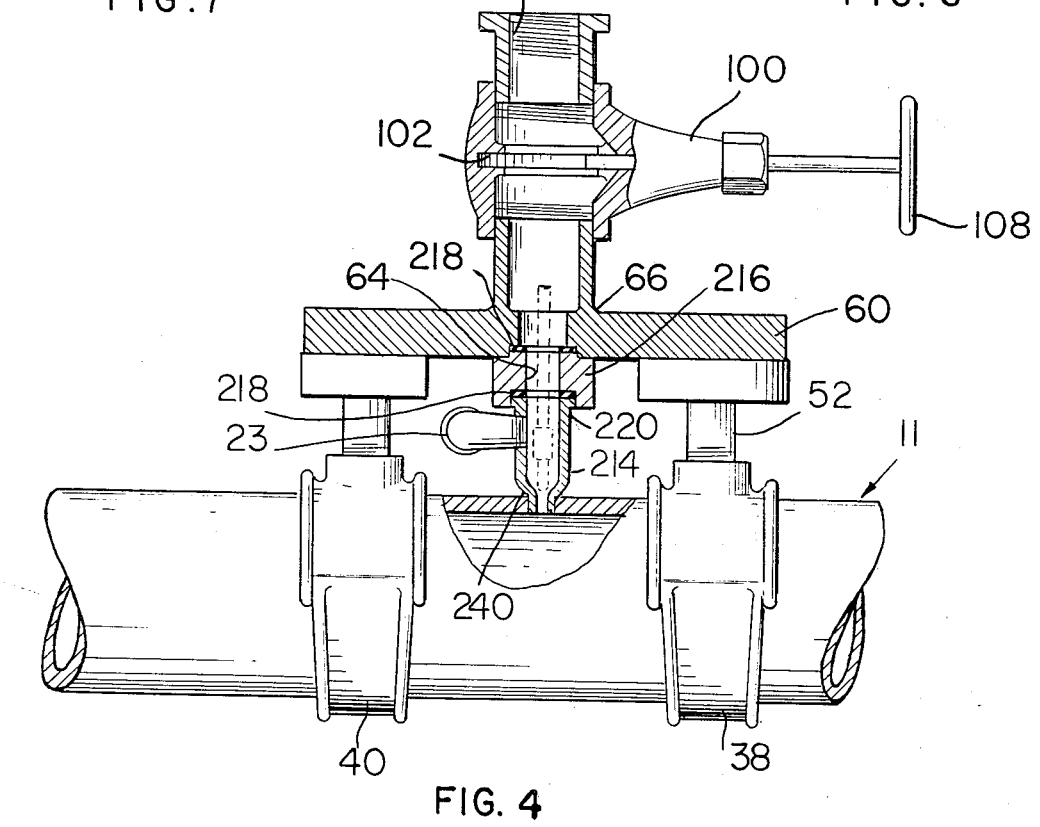

APPARATUS FOR EFFECTING OPERATIONS ON A FITTING ON A HIGH PRESSURE GAS MAIN

This Application is a Divisional Application of Charles William Ray, Ser. No. 807,846, filed March 17, 1969, now U.S. Pat. No. 3,626,576 "METHOD FOR REPAIRING PRESSURE LINES SUCH AS GAS MAINS AND THE LIKE."

BACKGROUND OF THE INVENTION

Leakages in service mains are a common occurrence. When such leakages occur, the usual procedure is to excavate at the location of leakage where the service line taps into the main, and then seal the main off upstream of the defective service line so that the repair can be made. At the time that the main is sealed, obviously service is temporarily suspended for all consumers downstream of the location where the seal is placed in the main to permit repairs. The entire operation as described is time-consuming and an altogether unsatisfactory method of repairing a main because of the inconvenience to the consumers and the wasteful nature of the repair. For example, the valve which is used in effecting a temporary seal of the main is not removable and becomes a permanent but useless part of the main after the repair operation is terminated. Taking into account the disruption of service the number of repair personnel, the time required for effecting a repair, and the wasted parts involved, the total operation must be considered totally unsatisfactory under present practices. Nevertheless, the repair operation descried is standard and has been followed for many years by utility company repair crews.

While many people are aware of the problems described, little has been done to advance the state of the art in obtaining a more reliable and advantageous repair method.

OBJECTS OF THE INVENTION

One of the objects of the present invention is to improve the method of repairing leakages from gas mains wherein the repair can be effected without disrupting normal service to the consumers downstream of the defect.

A further object of the present invention is to provide a repair method of a gas main while it remains fully pressurized and without introducing any element of substantial risk or hazard to the repairmen.

Another object of the present invention is to provide a new and improved method for repairing mains in which the repair is in the form of a simple plug which cuts out the defective service outlet and which does not require extensive components which must be permanently secured to the gas main.

A still further object of the present invention, is to provide an improved method for repairing gas mains which can be performed with a relatively fewer number of repair personnel and which can be carried out in a much shorter time so that the expense of a given repair operation is substantially reduced; and, as a consequence, with the same number of repair personnel it is possible to perform substantially greater number of repair operations in a given period, thus upgrading the overall distribution network. Of course, the method itself is relatively simple and can easily be mastered by repair personnel having only ordinary skill in this art.

Other objects and features of the present invention will become apparent from a consideration of the following description which proceed with reference to the accompanying drawings.

DESCRIPTION OF DRAWINGS

FIG. 4 is a view similar to FIG. 1 but showing a main of cast iron and with an outlet fixture somewhat different from that of FIG. 1 between the main and the service line;

FIG. 5 illustrates the drilling-and-tapping operating tool which is threadedly joined to the end of the conduit;

FIG. 6 is an enlarged view of the drilling-and-tapping tool; and

FIG. 7 is an enlarged view of the tool which is used for plugging the drilled-and-tapped opening produced by the tool shown in FIG. 6.

DETAILED EXPLANATION OF THE INVENTION

There are generally speaking, two types of gas mains which can be repaired in accordance with this invention, the one is a steel main and the other is a cast iron main. Essentially the operations are the same in each instance, but there are some differences which will be pointed out in the following description.

Figure 1:
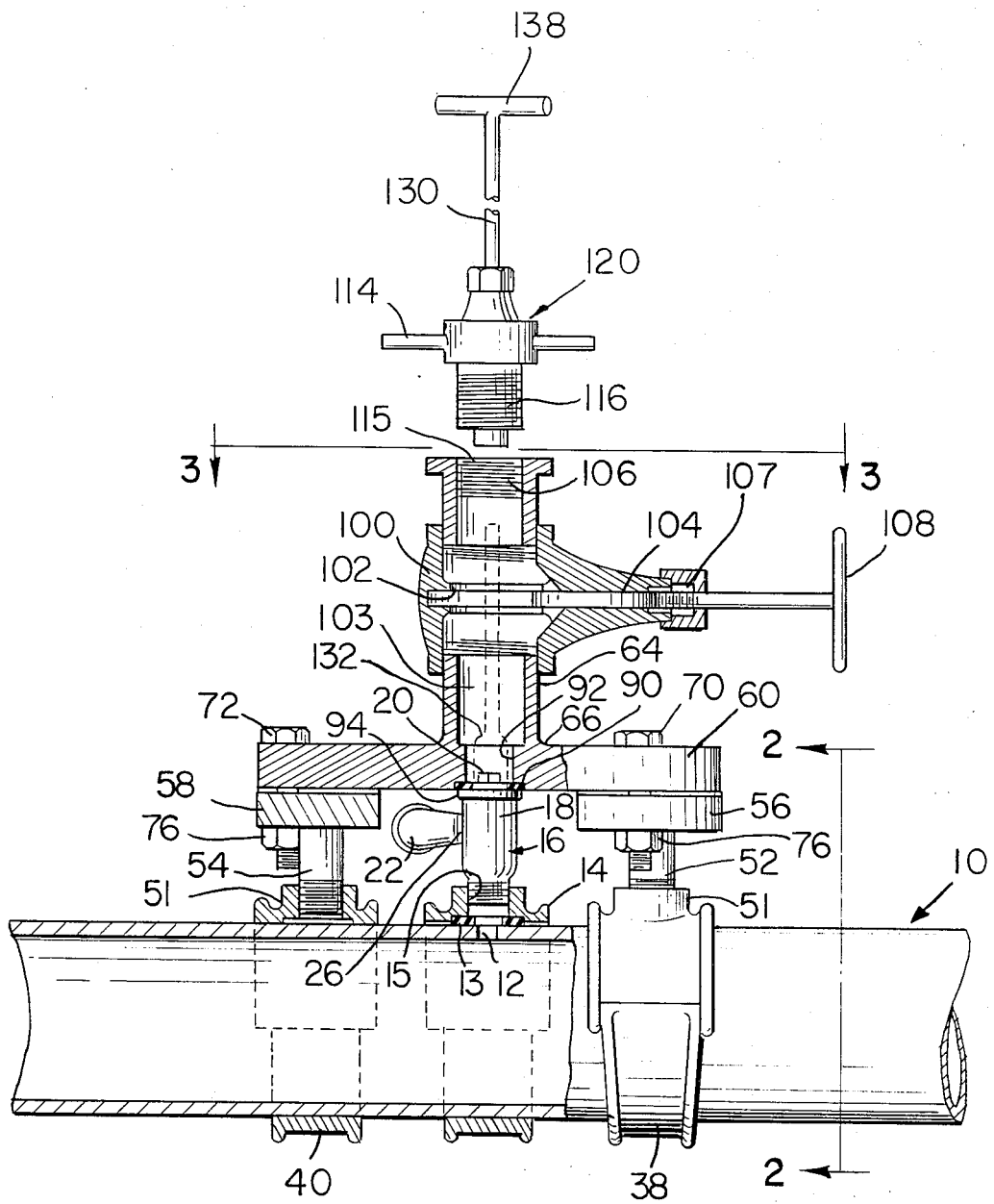
FIG. 1 illustrates the section of a gas main being repaired, and with repair apparatus illustrated thereon, a portion of the apparatus being broken away to illustrate the internal structure of the repair apparatus.
Figure 2:
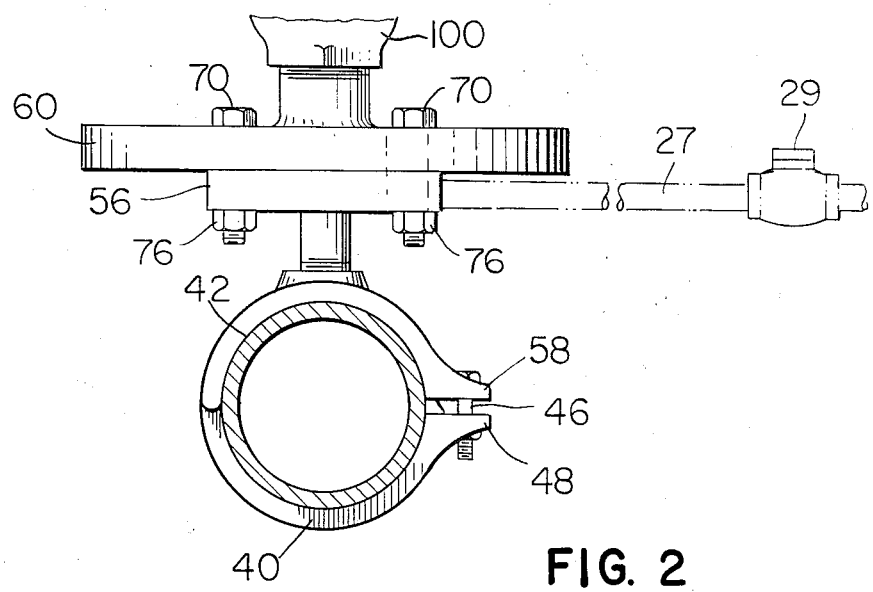
FIG. 2 is a side elevation view of the gas main and mounting structure, looking in the direction of the arrows 2—2 in FIG. 1.

A gas main, designated generally by reference numeral 10 in FIG. 1 has a service outlet opening 12 sealed by O-ring seal 13 and surounded by a collar 14 which encircles the main. The collar 14 has a threaded opening 15 into which is screw threaded a service outlet fixture 16 including a stub-fitting 18 with a threaded plug 20 and an elbow 22 which is threadedly joined at 26 to the stub fitting 18 and by a sleeve (not shown) to service line 27. Should the service line become defective, the valve 29 (FIG. 2) at the dwelling or other consumer location, is first turned off, and this is the only consumer service which is terminated during the repair operation. Next, two saddles 38 and 40 are clamped one on each side of the service outlet as shown in FIG. 1, each saddle including semi-circular collars 40, 42 which are hinged together by hinge pins and the two sections are drawn together by means of a bolt 46 which passes through aligned openings in flanges 48 and 50 (FIG. 2).

Each saddle has an internally threaded boss 51 which threadedly receives pipe sections 52 and 54 which serve as posts for pads 56 and 58. A platform 60 having a conduit 64 welded at 66 to the platform is placed upright over the service outlet and is then secured by means of bolts 70, 72 and nuts 76 on the ends of bolts 70, 72 draw the platform downwardly so that a sealed recess 90 is brought into engagement with shoulder 94 of the fixture 16. Opening 92 of the platform 60 overlies a plug 20 in the fixture 16 and is sufficiently oversized to permit insertion of the tool to remove the plug 20 and further registers with the axis of the stub fitting 18 so that other repair operations can be effected on the body of the main 10.

The conduit 64 has a transverse gate valve 100 with a diaphragm 104 which seals the lower end of the conduit 64 into a lower sealed compartment 103 and an upper compartment 106 which is at times sealed. The diaphragm 104 is operated by a stem which passes through a gland packing 107 and is controlled by hand wheel 108.

At the upper end of the conduit 64 is a threaded opening 115 which receives a threaded male adapter fitting 116 of a tool carrier designated generally by reference numeral 120. A handle 114 is used for making the threaded connection between 116 and 115. The tool mounting 120 includes an elongated plunger rod 130 having a socket end 132 which fits over plug 20 that is unscrewed by turning handle 138. The socket end is magnetized so that it will retain the plug 20 when it is unthreaded and is then removed.

After 116 and 115 are joined, the gate valve 100 is opened, withdrawing diaphragm 104 sufficiently so that the rod 130 and socket end 132 can be passed downwardly through the conduit 64 as indicated by the dotted line position in FIG. 1; and after the plug is unthreaded and raised sufficiently to enter compartment 106 the gate valve is again closed sealing compartment 103 from the compartment 106, and the fitting 116 is unfastened from 115 permitting removal of the plug 20.

The opening 12 is next drilled to a larger size and tapped by means of a tool 140 (FIG. 6) and a tool-operating mechanism designated generally by reference numeral 142 (FIG. 5). With the gate valve 110 still closed, the threaded adapter fitting 144 of tool operating mechanism 142 is threadedly joined to internally threaded opening 115, this being accomplished by means of the irregularly sided flange 146 which can be gripped by a wrench. The body 148 of tool 142 has internal threads for receiving an externally threaded sleeve 150, and a threaded collar 154 screws onto the threaded exterior of sleeve 150 and has integral handles 156 which are spaced approximately 90° apart. As the handles 156 are turned, it will raise or lower pressure fingers 158 which are pivot mounted on the handles and include extensions 160 which overlie a flange 162 of plunger stem 164. The plunger rod 164 has an internally threaded end 165 which receives a threaded adapter 167 of tool 140 having a drill 168 and a tap 170 at the end of stem 172. The stem 172 has integrally formed irregularly shaped sides 174 by which a wrench can be used to make the connection between threaded end 167 and an internally threaded opening 165 at the end 178 of plunger rod 164.

As the plunger rod 164 passes through sleeve 150 it is sealed by suitable gland packing (not shown) so that the plunger rod 164 can be rotated and moved longitudinally (in an upward and downward direction referring to FIG. 5) while maintaining a seal between the plunger rod 164 and sleeve 150.

After the threaded adapter 144 is threadedly joined to opening 115 the gate valve 100 is opened and the plunger rod 164 is lowered further to bring the end of drill 168 into drilling contact with opening 12 (FIG. 1). Downward pressure is exerted on the tool by rotating collar 154 through handles 156 whereby the collar 156 and fingers 158 move downwardly and through the flange 162, the plunger rod and drill 168 are biased downwardly. The drill 168 is rotated by means of a crank arm 190 with a handle 192. After the drilling is completed, the tap 170 is then passed through the newly drilled, enlarged opening, and when the tapping is completed the drill and tap are removed upwardly by reversing rotation of the crank 190. The collar 154 is raised by reverse turning the handles 156 causing the collar 154 to move upwardly on the threaded sleeve 150 and after the tool is raised sufficiently out of compartment 103 the gate valve 100 is closed and the threaded adapter 144 is decoupled from threaded end 115 of the conduit.

A third tool designated generally by reference numeral 200 in FIG. 7 is then fitted onto the end 178 of the plunger rod 164 by means of threaded end 202 of stem 204. Irregularly sided flange 206 permits use of a wrench to effect this coupling. At the end of stem 204 is a magnetized Allen wrench 208 which carries a set screw plug 210, the set screw plug 210 being dimensioned to fit with the enlarged drilled, and tapped opening produced by drill 168 and tap 170. The threaded adapter 144 is refitted to end 115 and valve 100 is then opened to permit the insertion of plug 210 through the conduit 64 and into the drilled and tapped opening produced by drill 168 and tap 170.

As a result, the original opening 12 is enlarged, tapped, and replugged severing the main 10 entirely from service line 27 without venting the main 10 which continues under normal pressure and in full service to all of the other consumers through their respective service lines.

It will be understood that the drill 168 and tap 170 pass not only through the conduit 64, but also through the length of the outlet fixture 16 in reaching the openings 12. The conventional fixture 16, therefore, has an internal diameter large enough to permit the passage of the drill and tap and tool 200 therethrough.

When the operation is completed, the bolts 70 are removed and the saddles 38, 40 detached from the main 10 thereby removing the repair apparatus described.

For different size mains I provide different size saddles which are selectively joined to the apparatus through the threaded ends of pipes 52 and 54. This invention is readily usable with any different size mains, the only change being a proper selection of the size of the saddle appropriate to the main size.

It will be apparent, that from the foregoing description, there is no requirement for insertion of a cutoff valve in the main, which, under previous practice remains with the main and was an expensive item to expend. I also omit the welding operation previously employed to attach such additional parts to the main.

As described, the entire procedure can take place with only two or at the most three repairmen, and the time required for effecting a repair in the manner described is of much shorter duration than conventional repairs in which the main was itself sealed off. A repair operation previously requiring three or four men four hours, can now be accomplished by a two man crew in about one hour.

When the main is a cast iron main and not a steel main, the drilling and tapping occurs through the fixture 214 (FIG. 4), there being a somewhat different arrangement in the tapoff for the service line 27 as compared with the tapoff for the service line 27 in a steel main. In this case, there is provided an adapter block 216 which is press-fitted against a seal 218 in the recessed opening 64, and a second seal 218 is provided between recessed end 220 of adapter block 216 and flange 220 of fixture 214. As indicated by the dotted-lines in FIG. 4, the drilling and tapping occurs at the throat 240 of fixture 214, and it is plugged in the same manner with a suitably sized plug which fits the dimension of the drilled and tapped opening. After the apparatus is removed, the fixture 214 is then cut off above the throat 240, and the service line is thus separated from the main.

In all other respects the repair operation is the same as previously described with respect to uncapping the original plug 20, drilling and tapping and then replugging in proper sequence. The valve 100 is operated to allow the successive tools to pass through the conduit 64 so that the main 10 in this instance, as in the previous instance is continuously maintained sealed from the atmosphere thereby maintaining a continuation of service to the downstream consumers.

OPERATION OF THE INVENTION

Once a service line 27 has been determined to be defective, an excavation is made to the level of the main 10 at the location of tapoff of the service line 27 into the main 10.

Figure 3:
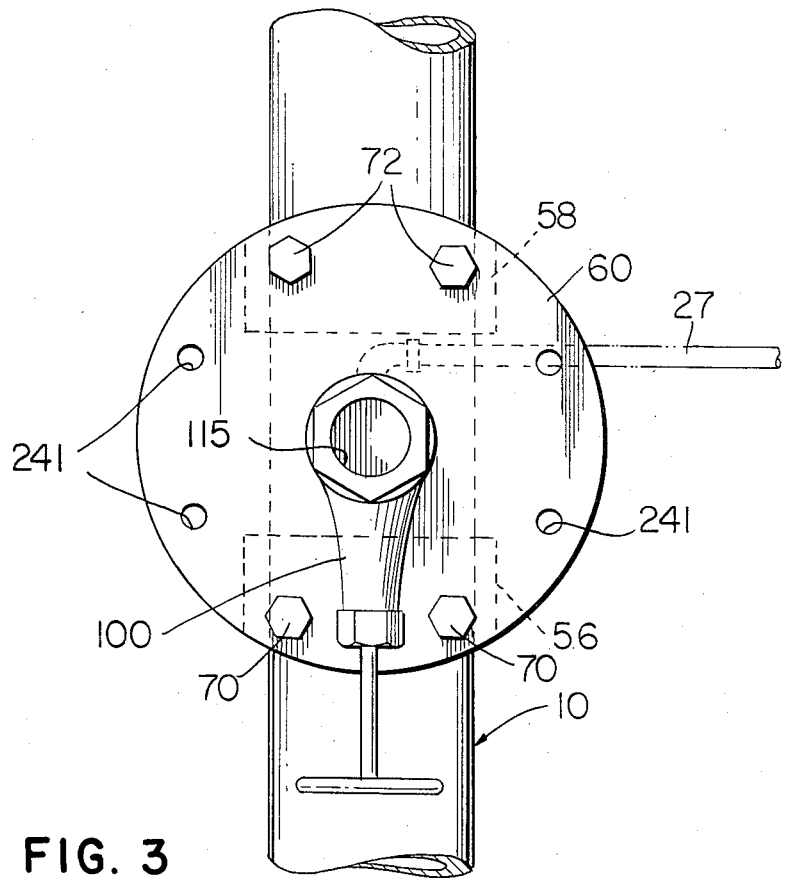
FIG. 3 is a section view taken on line 3—3 of FIG. 1.

The two saddles 38 and 40 are then coupled one on each side of a service line outlet saddle 14 and are clamped in place by means of bolt 46. The mounting pipes 52 and 54 are then screwed into threaded bosses 51 and the platform fixture 60 is then mounted in place through one or the other of its mounting openings 241 (FIG. 3) at whatever angular position is most convenient for the platform fixture 60. The clamping bolts 70 are then passed through openings 241 and through companion opening in mounting pads 56, 58 and are then tightened down to form a sealed connection between recess 90 and shoulder 94 of the outlet fixture between the main 10 and the service line 27.

The threaded end 116 of the tool operator 120 is then screwed into the threaded open end 115 of the conduit and the gate valve 100 is opened by wheel 108, retracting the diaphragm 104 to the position shown in FIG. 1 and the elongated plunger rod 130 is then lowered, bringing the socket ended tool 132 into contact with plug 20 and handle 138 is then rotated to unscrew the plug 20 which is then removed, the socket being magnetized to retain the plug 20.

After the plunger 130 is raised together with the tool and attached plug 20 and before unscrewing adapter 116 from threaded end 115, the gate valve is closed by the wheel 108 thus isolating compartment 103 from compartment 106. The tool operator 120 is then separated from the conduit by unscrewing adapter 116 and in place of socket ended tool, a new tool 140 is attached, by threadedly joining the end 167 (FIG. 6) to end 178, the tool 140 being equipped with the combination drill 168 and tap 170 shown in FIG. 6. After adapter 144 is joined to 115, the gate valve 100 is again opened, and by operating handles 156 the collar 154 is screwed down causing the fingers 158 to apply downward pressure on the plunger rod 164 through its flange 162 and causing the drill 168 to bear against the service outlet opening 12. Note that the drill passes not only through the conduit 64 but also through the length of the outlet fixture 16 in reaching opening 12 (FIG. 1).

The handle 192 is then rotated to operate the crank arm 190 and rotate the rod 164, stem 140, and drill 168, thus drilling a larger size opening which is then tapped with tap 170.

After drilling and tapping is completed, the handles 156 are counterrotated raising the collar 154 and detaching the fingers 158 from the flange 162 permitting raising of the rod 164 and attached stem 140 together with the drill 168 and tap 170 tools. The handle 192 is then used to raise the tool 140 into chamber 106 and the wheel 108 is then turned to close the diaphragm 104 sealing compartment 103 from 106 and the adapter 144 is next decoupled from end 115.

The tool 200 (FIG. 7) having the Allen wrench end 208 with magnetically attached plug 210 is then fastened to the tool operator 142, and end 144 is recoupled with internally threaded opening 115 of the conduit 64. The gate valve is again operated to an open position and plunger rod 164 is lowered to bring the set screw plug 210 into position with the enlarged tapped, opening formed by drill 168 and tap 170. The crank 190 is turned by handle 192 to screw the set screw plug 210 into position and then plunger or rod 164 is raised into chamber 106 and adapter 144 si unscrewed from threaded end 115. The saddles 38 and 40 are then removed by unfastening bolts 46 and saddle 14 can also then be removed or can be left on the main 10. The service line 27 is thus effectively sealed from the main while the main 10 remains fully pressurized at all times and consequently the service to the downstream consumers is at all times undisturbed.

One of the important values of the present invention is that leakage from the main is held at an absolute minimum during the time of reppair; and, consequently, there is substantially less hazard to the repairmen. The opportunities of explosion and wasteful vending of gas is minimized since the repair operations are always conducted under closed conditions. Furthermore, the number of servicemen required to carry out the operations described is substantially less than normally provided, and the operation as a whole can take place within a much reduced period of time so that the cost per repair operation is reduced. Also, since repairmen's time is more efficiently utilized, it is possible to upgrade the service network as a whole because a greater number of repair operations can be performed within a given period of time. I have also found, that because the repair apparatus is localized, it does not require sealing off of the entire main; a smaller excavation is required, and this also contributes to a reduced repair time and a more efficient repair time.

The present invention is applicable not only to gas mains but to other fluid carrying lines as well, as for example oil pipe lines, water mains, natural gas lines, gasoline and other petroleum product lines. In short, any fluid line which it is desired to be repaired can be serviced in the foregoing manner and I intend that the following claims include such application within their scope.

It should be further noted, that the only addition to the main is a plug 210, whereas previously there was an added expensive valve which had to be added to the main to seal off the main and become a permanent part of the main. There is no corresponding loss of components in the present invention; and this also adds to the greater economy of a repair operation.

In the case of a cast iron pipe repair, where the repair is effected through the outlet fixture, referring to FIG. 4, the plug is first removed from the fixture 214. The procedure is the same as removal of plug 20 in the steel main; but, the boring and tapping take place within the outlet fixture 214, this bored and threaded opening then becoming sealed with a replacement plug 210. The outlet fixture to the service line is then severed above the throat 240 (FIG. 4), and that is the final operation.

Although the present invention has been illustrated and described in connection with certain selected example embodiments, it will be understood that these are illustrative of the invention and are by no means restrictive thereof. It is reasonably to be expected that those skilled in this art can make numerous revisions and adaptations of the invention, and it is intended that such revisions and adaptations will be included within the scope of the following claims as equivalents of the invention.

What is claimed is:

1. Apparatus for effecting operations on a fitting on a high pressure gas main, the fitting extending away from the main and a service conduit extending from the fitting and terminating with an end having a circular shoulder, said apparatus comprising mounting means adapted for rigid clamping to said main at the location of the fitting, conduit means supported by said mounting means to form a concentric sealed connection with the shoulder of the fitting, said conduit means including an access conduit providing a sealed conpartment enclosing the end of the fitting, valve means disposed in said conduit means and adapted to be opened and closed to provide access to the fitting through said sealed compartment, tool mounting means having a sealed connection with said conduit means and forming in combination with said conduit means a second sealed compartment in communication with said first mentioned sealed compartment through said valve means, and a tool means operated by said tool mounting means and movable through said first and second compartments when the valve means is opened for access to the fitting for effecting operations thereon.

2. The apparatus of claim 1 in which said mounting means includes a pair of clamps adapted to be disposed on the main on opposite sides of the fitting, said conduit means including a rigid plate extending between and supported on said clamps, said plate being provided with an opening therethrough in concentric registry with the end of the fitting and communicating with said first mentioned sealed compartment, and a sealing ring concentrically disposed in said opening peripherally and concentrically to engage the shoulder of the fitting.

3. The apparatus of claim 2 in which each of said clamps includes a saddle clamp adapted to be rigidly fastened about the main, a mounting pad rigidly supported on said saddle clamp, and fastening means for connecting the adjacent portion of said plate to said pad.

4. The apparatus of claim 3 in which said pads and said fastening means are disposed, when said fastening means are tightened, to pull said mounting plate and said sealing ring securely against the shoulder of the fitting.

5. The apparatus of claim 4 in which each of said clamps includes a post for rigidly supporting its mounting pad, said post extending generally parallel to the fitting away from the main.

6. Apparatus for effecting operations on a fitting extending outwardly from a high pressure gas main, the fitting terminating with a distal end having a circular shoulder and a removable plug concentrically disposed therein, the fitting defining an internal space in communication with the interior of the main through an aperture in the wall of the main and with a service line leading away from the fitting, said apparatus comprising, a pair of clamps proportioned and designed rigidly to engage the main on opposite sides of the fitting, conduit means including a mounting platform mounted on said clamps and having a through opening therein concentrically to receive the distal end of the fitting, sealing means disposed in the opening sealably to engage the shoulder of the fitting, said conduit means providing a sealed compartment in communication with said opening at the end of the fitting, valve means disposed in said conduit means and adapted to be opened and closed to provide access to the internal space of the fitting through the sealed compartment, tool mounting means having a sealed connection with said conduit means and forming with said conduit means a second sealed compartment axially outwardly from said first mentioned sealed compartment and in communication therewith through said valve means, and tool means cooperatively associated with said tool mounting means and movable through said first and seond compartments when said valve means is opened for access to the fitting and the interior space thereof.

7. The apparatus of claim 6 including means for mounting said platform on said clamps, said mounting means including a mounting pad rigidly attached to each clamp, and fasteneing elements for securing said platform to said pads.

8. The apparatus of claim 7 in which said pads and fastening elements are disposed such that, when said fastening elements are tightened, said platform is pulled against the fitting to accomplish a tight seal between said platform and the shoulder of the fitting.

9. The apparatus of claim 6 in which said tool means includes a magnetic wrench for removing the removable plug from the end of the fitting to provide access to the interior space thereof.

10. The apparatus of claim 9 in which said tool means includes drill and tap means for forming a tapped opening in the wall of the main.

11. The apparatus of claim 9 in which said tool means includes drill and tap means for forming a threaded opening in the throat of the fitting adajcent the main.

* * * * *